United States Patent [19]

Arvin

[11] Patent Number: 5,452,973
[45] Date of Patent: Sep. 26, 1995

[54] TRUCK BED CARGO NET

[76] Inventor: Adrian H. Arvin, 214 Johnson Rd., N. Augusta, S.C. 29841

[21] Appl. No.: 349,515

[22] Filed: Dec. 5, 1994

[51] Int. Cl.⁶ .............................. B60P 7/14; B61D 45/00
[52] U.S. Cl. ................................... 410/118; 410/117
[58] Field of Search ...................... 410/117, 118, 410/129, 96, 97; 296/50, 37.1, 100; 280/749

[56] References Cited

U.S. PATENT DOCUMENTS

| | | | |
|---|---|---|---|
| 276,053 | 4/1883 | Lewis | 410/129 X |
| 2,455,237 | 11/1948 | Davis | 410/97 |
| 3,478,394 | 11/1969 | Davis | |
| 3,897,919 | 8/1975 | Weingarten | 410/97 |
| 3,961,585 | 6/1976 | Brewer | |
| 4,168,667 | 9/1979 | Loomis | 410/118 |
| 4,436,466 | 3/1984 | Marino | 410/118 |
| 4,964,771 | 10/1990 | Callihan | 410/96 X |
| 5,050,924 | 9/1991 | Hansen | 410/97 X |
| 5,090,856 | 2/1992 | Moore | 410/117 X |
| 5,110,172 | 5/1992 | Ney et al. | 296/50 |
| 5,121,958 | 6/1992 | Goeden et al. | 410/117 X |
| 5,149,164 | 9/1992 | Wilson | 296/50 |
| 5,275,458 | 1/1994 | Barben et al. | 296/50 |
| 5,290,086 | 3/1994 | Tucker | 280/749 |
| 5,351,827 | 10/1994 | Baka | 410/117 X |

FOREIGN PATENT DOCUMENTS 4002534  1/1992  Japan .......................... 410/97

*Primary Examiner*—Michael S. Huppert
*Assistant Examiner*—Stephen Gordon

[57] ABSTRACT

A truck bed cargo net wherein a perimeter web secures a mesh web therewithin, and the mesh web extends only between the side portions of the perimeter web to define openings between the mesh web and the first and second ends of the perimeter web to permit cargo to project therethrough minimizing damage to the mesh web. Strap and tether lines are arranged to extend from the perimeter web for securing the perimeter web within a truck bed.

5 Claims, 4 Drawing Sheets

5,452,973

1
TRUCK BED CARGO NET

TECHNICAL FIELD

The field of invention relates to cargo support structure relative to a pickup truck bed, and more particularly to a truck bed cargo net wherein the same is arranged to secure and contain cargo components within a pickup truck bed structure.

BACKGROUND OF THE INVENTION

Various prior art structures and organizations have been employed relative to transport of cargo within a pickup truck bed, wherein such is exemplified by U.S. Pat. Nos. 5,110, 172 and 5,149,164 relative to pickup truck bed tailgates and liner structure.

The U.S. Pat. No. 3,961,585 is directed to a cargo net that is arranged for surrounding and securing cargo relative to a pallet, with the U.S. Pat. No. 5,275,458 indicating construction relative to a tonneau cover.

U.S. Pat. No. 3,478,394 relative to a web hardware adjuster is provided and incorporated herein by reference as an example of strap adjusting structure.

SUMMARY OF THE INVENTION

The truck bed cargo net of the invention comprises a mesh web secured to a surrounding perimeter web, such that openings are directed through the mesh web within the perimeter web adjacent ends of the perimeter web to accommodate cargo projections to be received therethrough to minimize damage to the net. Securing straps and tethers are secured at various positions about the perimeter web for securing the invention relative to a pickup truck bed.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
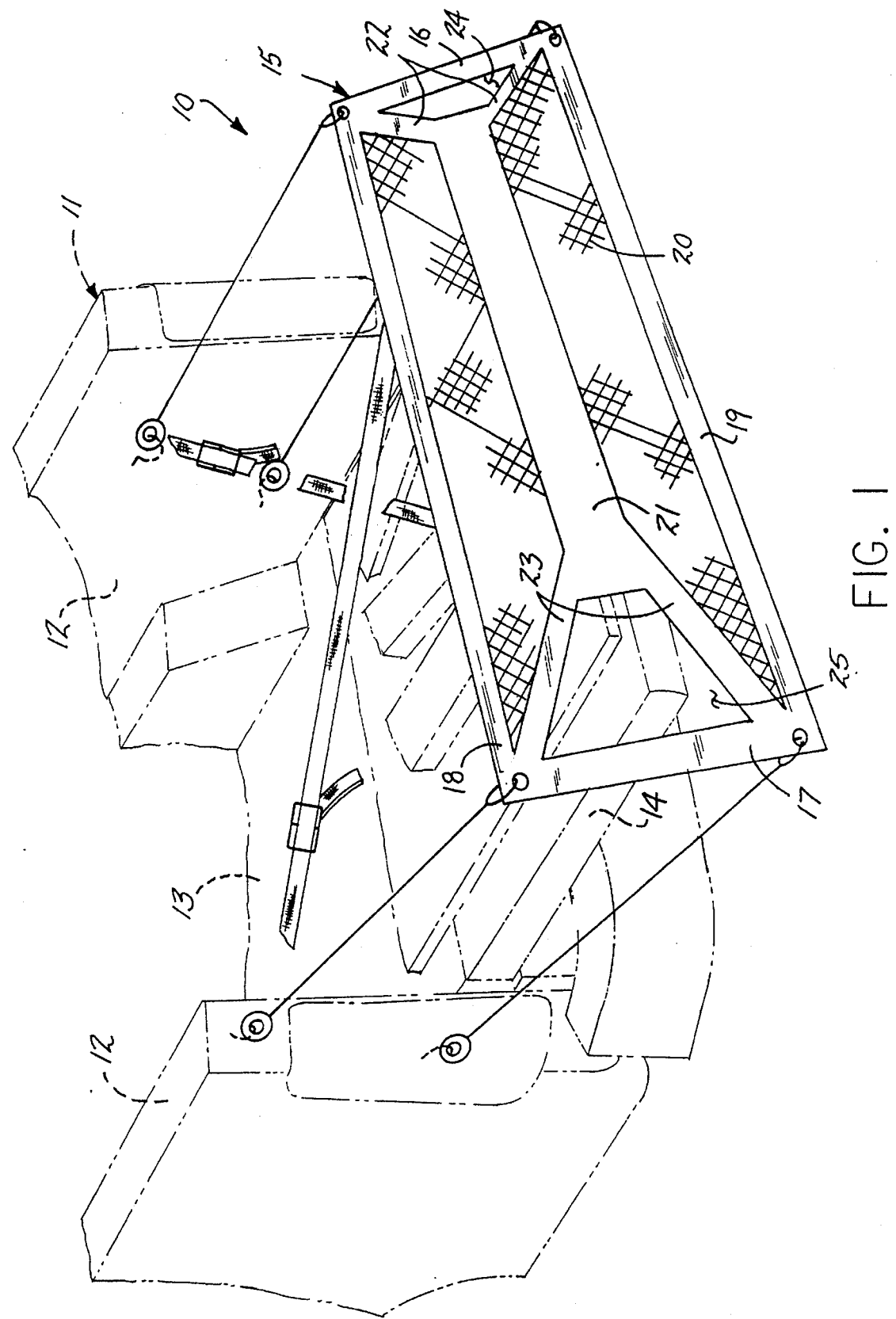
FIG. 1 is an isometric illustration of the invention in use.
Figure 5:
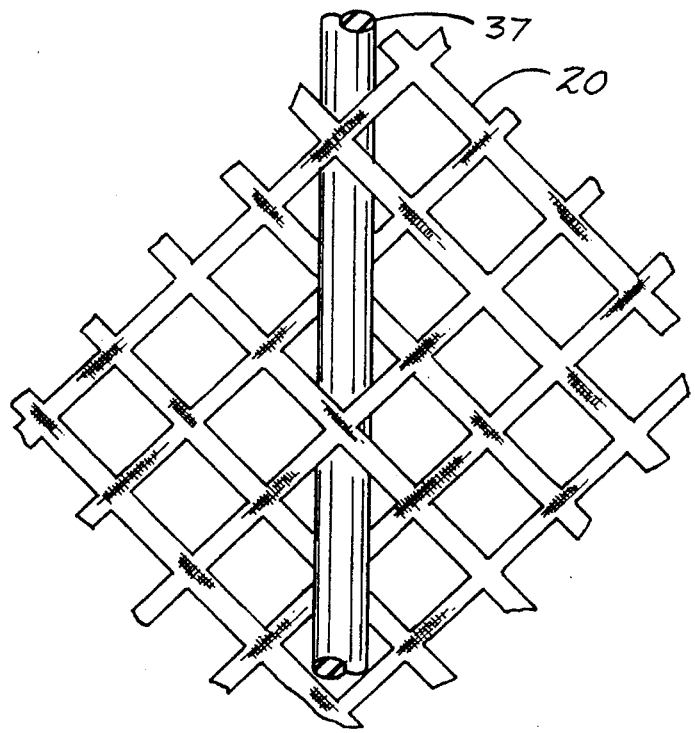
FIG. 5 is an enlarged plan view about the section 5, as indicated in FIG. 2.
Figure 6:
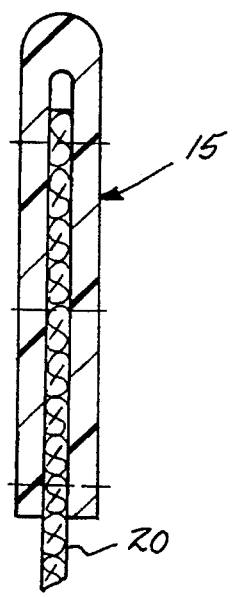
FIG. 6 is a cross-sectional illustration, taken along the lines 6—6 of FIG. 2.

The truck bed cargo net 10 of the invention is arranged for securement to a truck bed 11 that is formed with conventional side walls 12, as well as a floor 13, with a tailgate 14 pivotally mounted to the floor 13 in a well known manner. The cargo net 10 includes a flexible perimeter web 15 typically employing a U-shaped cross-sectional configuration (see FIG. 8) to capture the perimeter of an associated mesh web 20. Other suitable manners of securing the mesh web 20 to the perimeter web 15 may be employed, but the desired configuration is presented. The perimeter web 15 is formed with a first end web 18 spaced from a second web 17, as well as a first side web 18 spaced from a second side web 19 to secure the mesh web 20. It should be noted that the mesh web 20 extends between the first and second sides 18 and 19, but typically does not engage the first and second end webs 18 and 17. Further, a flexible reinforcing web 21 is oriented substantially medially of the first and second sides 18 and 19 and spaced from the first and second end webs 18 and 17, such that a first end of the reinforcing web 21 terminates in a plurality of first legs 22 that engage respective intersections of the first end webs 18 with the first and second sides 18 and 19. Similarly, a second end of the reinforcing web 21 terminates in a plurality of second legs 23 extending therefrom and extending into a further plurality of intersections of the second end web 17 as they intersect the first and second sides 18 and 19 thereby defining a first opening 24 between the first legs 22 and the first end webs 16, and a second opening 25 between the second legs 23 and the second end webs 17. The first and second openings 24 and 25 are employed, as illustrated in FIG. 1, to accommodate the corner portions of lumber and the like, as well as appliances or other cargo to thereby project into one of the openings 24 and 25 to minimize damage to the mesh web 20. The reinforcing web 21 and the associated leg portions provides for this strengthening of the mesh web while retaining its flexibility in use. It should also be noted that optionally the employment of reinforcing lines 37 of flexible construction (see FIG. 5) are interwoven of the mesh web 20 extending between the first and second side webs 18 and 19, as illustrated in the FIGS. 2 and 5 for example.

Figure 3:
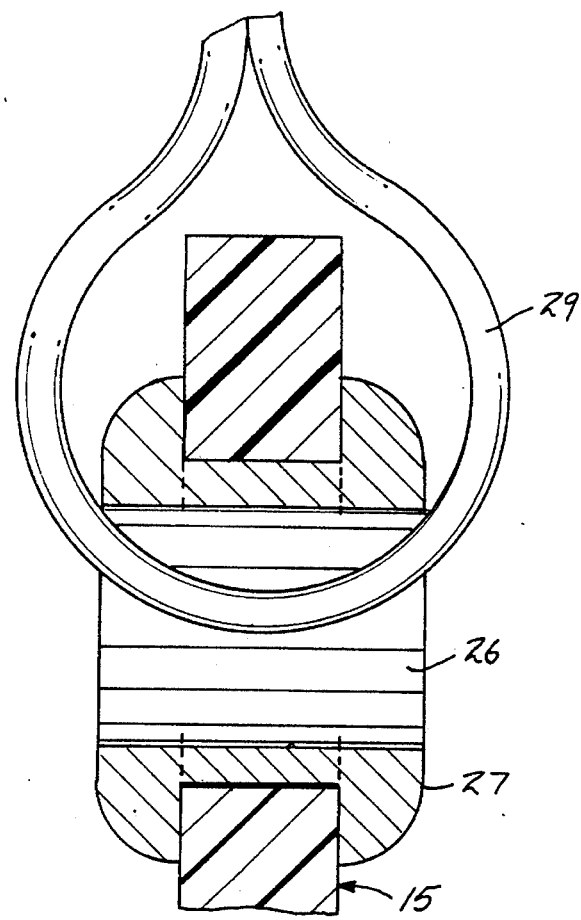
FIG. 3 is a cross-sectional view, taken along the lines 3—3 of FIG. 2.
Figure 4:
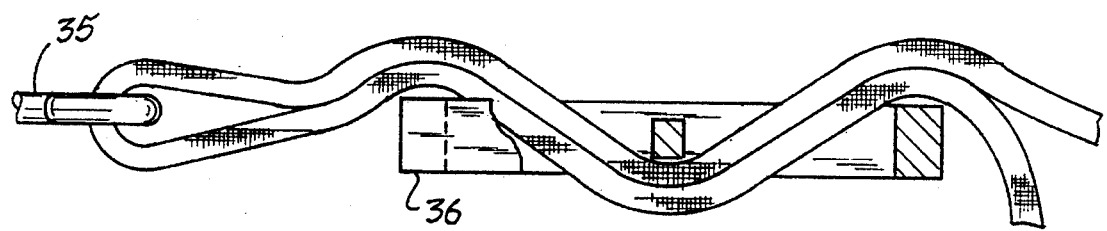
FIG. 4 is a side view, taken along the lines 4—4 of FIG. 2 in the direction indicated by the arrows.

Each intersection, as noted, of the respective first and second end webs 16 and 17 with the first and second side webs 18 and 19 is provided with an intersection opening 26, having a reinforcing grommet 27 in surrounding relationship (see FIG. 3). To this end, a loop 29 is received about the perimeter web 15 extending through one of the intersection openings 26, such that each loop 29 further is provided with a connecting tether 28 that itself terminates in a connecting ring 33 for securement to various hooks and the like within the truck bed 11. Further, optionally employed are at least one, if not a plurality, of fastener straps 34 extending from each of the first and second side webs 18 and 19, with each of the fastener straps 34 terminating in a connecting hook 35. The fastener straps 34 may each be provided with an adjusting buckle 36, of a type as illustrated in FIG. 4, or as exemplified by the U.S. Pat. No. 3,478,394 incorporated herein by reference. Such buckle structure of any type may be employed for the adjusting purposes, but the examples illustrated are provided for purposes of example and use of the organization.

Figure 2:
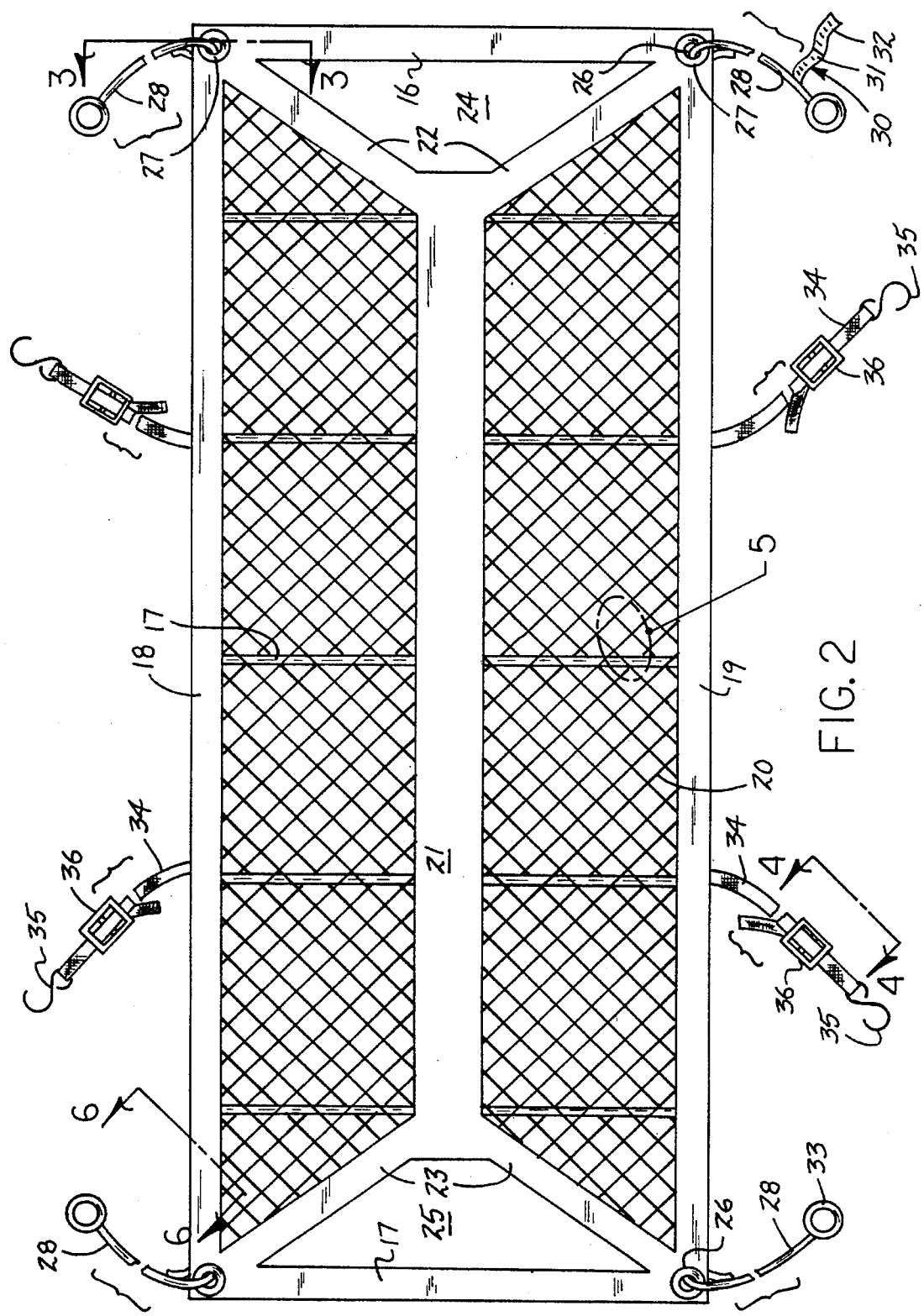
FIG. 2 is a top plan view of the invention.

FIG. 2 further indicates the use of a hook and loop fastener web 30 secured to one of the connecting tethers 28. The fastener web 30 has a first hook and loop fastener portion, such as hook members, with a second fastener portion 32 arranged to engage the first fastener surface 31, such that for example the second fastener surface may employ connecting loop members for engaging the hook members of the first surface 31. In this manner, the first surface 31 is arranged for securement to the second surface 32 for securing various tether lines and the like to the fastener web 30 minimizing their being loosely transported, as well as permitting the securement of other securement lines (not shown) that may be employed when securing cargo within the truck bed.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by Letters Patent of the United States is as follows:

1. A truck bed cargo net arranged for securement and use with a truck bed for securing cargo within the truck bed, wherein the cargo net comprises, a flexible, continuous perimeter web having a first end web spaced from a second end web, and a first side web spaced from a second side web, with the first end web intersecting the first side web and the second side web at a plurality of intersections, and the second end web intersecting the first side web and the second side web at a plurality of further intersections, and a mesh web extending between the first side web and the second side web, wherein the intersections and the further intersections each have an opening, and each said opening having a tether line extending therefrom, and each tether line terminating in a fastening means for securing the perimeter web to the truck bed, a reinforcing web of flexible constriction, positioned between the first side web and the second side web, with the reinforcing web having a first end spaced from the first end web, and the reinforcing web having a second end spaced from the second end web, a plurality of first legs extend from the first end to the intersections, and a plurality of second legs extend from the second end to the further plurality of intersections, with a first opening surrounded by the first legs and the first end web, and a second opening surrounded by the second legs, and the second end web.

2. A cargo net as set forth in claim 1 wherein the perimeter web is of a generally U-shaped cross-sectional configuration and receives an outer perimeter of the mesh web therewithin.

3. A cargo net as set forth in claim 2 further including at least one reinforcing flexible line member extending between the first side web and the second side web, with each line member interwoven within the mesh web for reinforcing of the mesh web and maintaining geometric integrity of the perimeter web.

4. A cargo net as set forth in claim 3 wherein a fastener web is secured to one of said connecting tether lines, and the fastener web includes a first fastener surface arranged for engaging and securing a second fastener surface.

5. A cargo net as set forth in claim 4 including at least one fastener strap extending from each of said first side web and said second side web, wherein each said fastener strap includes an outer distal end, and the outer distal end has a connecting hook, and adjusting means receiving said fastener strap for effecting length adjustment of each said fastener strap.

* * * * *